April 7, 1953 — G. E. BREEZE — 2,634,316
CONTROL COMPASS WITH UNIVERSAL DRIVE
Filed July 23, 1946 — 2 SHEETS—SHEET 1

Inventor
GEORGE E. BREEZE
By M. Hayes
Attorney

April 7, 1953   G. E. BREEZE   2,634,316
CONTROL COMPASS WITH UNIVERSAL DRIVE
Filed July 23, 1946   2 SHEETS—SHEET 2

Inventor
GEORGE E. BREEZE

By M. O. Hayes
Attorney

Patented Apr. 7, 1953

UNITED STATES PATENT OFFICE 2,634,316

CONTROL COMPASS WITH UNIVERSAL DRIVE

George E. Breeze, Saugus, Mass., assignor to the United States of America as represented by the Secretary of the Navy Application July 23, 1946, Serial No. 685,584

1 Claim. (Cl. 175—41.5)

This invention relates to control compasses and more particularly to means for eliminating dip-needle error.

Such compasses are used in directional radio sono-buoys as shown in patent application 526,758, entitled "Remote Control or Measurement Indicating Means," OSRD–320, Navy Case 3728. Previous types of control compasses are described in patent application 561,414 entitled "Control Compass," OSRD–2903, Navy Case 4615, and patent application 564,256 entitled "Improved Control Compass," OSRD– 2904, Navy Case 4612. The present device constitutes an improvement over the above-mentioned control compasses in that dip-needle error due to tilting is eliminated without the use of follower magnets as shown in application Number 564,256 and no magnetic balancing is required.

In previous designs of control compasses, magnetic elements were constrained by two bearings giving only one degree of freedom of rotation. When the compasses were tilted there was deviation from correct north-south readings due to the tendency of the magnetic elements to become dip-needles under the constraint. Compensation of this deviation by counterbalances is unsatisfactory. In the present development, the magnetic elements have two degrees of freedom of rotation and hence the dip-needle deviation is eliminated.

An object of this invention is to provide a control compass having improved stability under rolling and jarring conditions encountered in choppy or rough water.

Another object is to provide a direct drive of the following element by the magnetic directing element.

A further object is to provide a universal drive arrangement for the following element to permit two degrees of freedom for the magnetic directing element, thus eliminating dip-needle error.

The invention also resides in certain novel structures and arrangements which facilitate the carrying out of the foregoing objects and which contribute both to the simplicity of the invention and to the reliability of operation.

Other objects and advantages of the invention will become apparent from the following detailed description taken in connection with the accompanying drawings in which.

Figure 1:
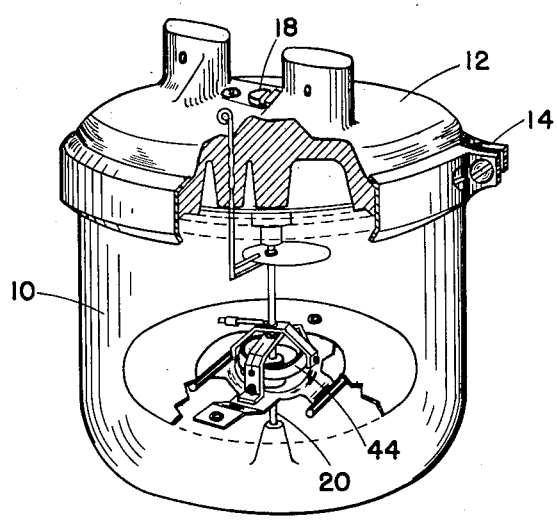
Fig. 1 is a perspective view, partly broken away, of the device.
Figure 2:
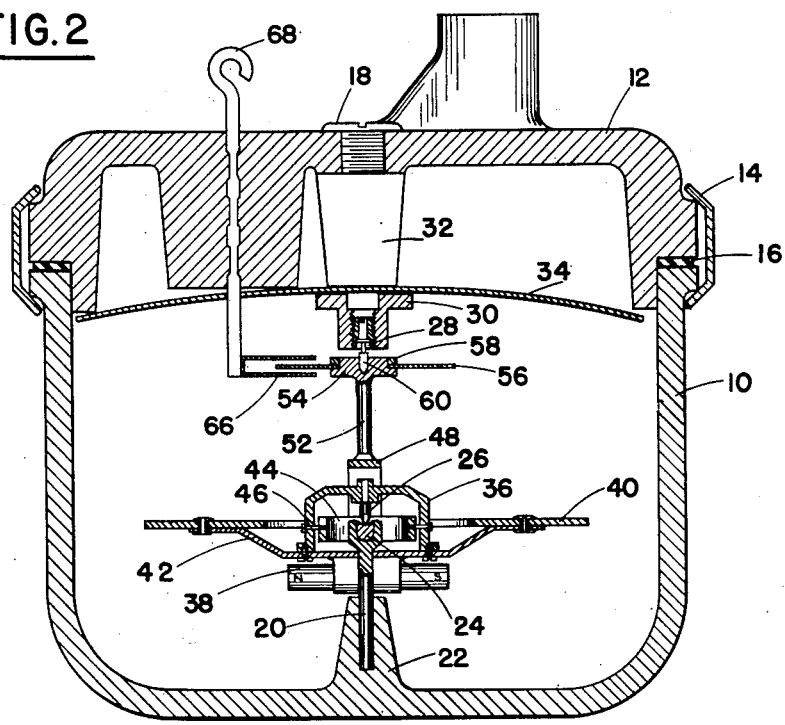
Fig. 2 is a vertical axial section of the device.

While the invention is susceptible of various modifications and alternative arrangements, I have shown in the disclosure and will herein describe in detail the preferred embodiment. It is to be understood, however, that I do not intend to limit the invention by such disclosure and I aim to cover all modifications and alternative arrangements falling within the spirit and scope of the invention as defined in the appended claim.

The working parts of the device are enclosed by a case 10 and a cover 12 held together by a clamp 14 and sealed by a gasket 16. A plug 18 in the cover permits filling the case with compass fluid. A spindle 20 affixed vertically in a central projection 22 from the bottom of the case carries a cup bearing 24 on which the rotor element is supported by a pivot 26. The upper end of the rotor element is steadied by a ring-and-plate bearing 28 carried by a holder 30 fastened to internally projecting lugs 32 on the cover 12. A splash plate 34 is held in place between the holder 30 and the lugs 32.

Figure 3:
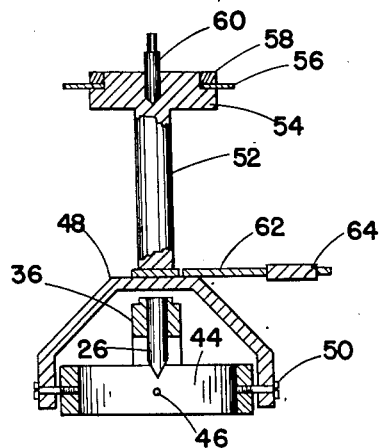
Fig. 3 is a vertical axial section of a portion of the device in a plane normal to that of Fig. 2.

The pivot 26 is fastened to a yoke 36 which supports magnets 38 and a damping card 40 on a spider 42. A ring 44 surrounding the bearing 24 is supported in the yoke 36 by diametrically opposed pivots 46 and is secured to a yoke 48 by pivots 50 spaced 90 degrees from the pivots 46 as shown in Fig. 3.

Figure 4:
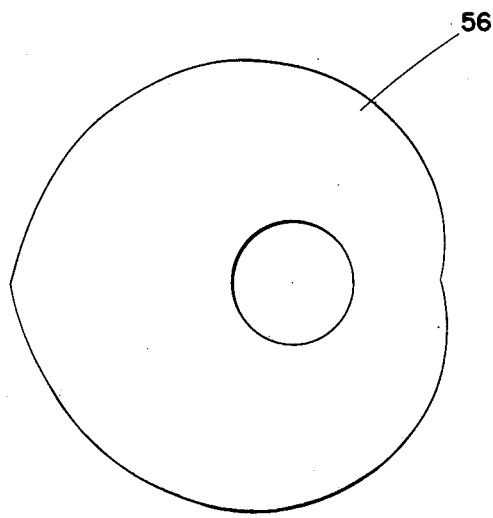
Fig. 4 is a detail of the condenser rotor plate.

The yoke 48 is secured to the lower end of a shaft 52. This shaft has a shoulder 54 on which a condenser rotor plate 56 is held by a locking ring 58. A spindle 60 on the upper end of the shaft enters the ring-and-plate bearing 28. The outline of the condenser rotor plate is generally that of a heart-shaped cam having a constant increase of radius with angle from a minimum radius to a maximum diametrically opposite, as shown in Fig. 4.

A counterweight arm 62 (Fig. 3) is fixed to the neck of the yoke 48 in such a position that an adjustable weight 64 will compensate for the unbalance caused by the condenser rotor plate 56.

A U-shaped condenser stator 66 formed of a narrow strip of metal is so supported by a terminal post 68 in the cover 12 that its arms are on opposite sides of the rotor plate 56 and are directed toward its axis of rotation.

In operation the compass element is held in one position relative to the surface of the earth by the action of the earth's magnetic field on the magnets 38, and thereby maintains the condenser rotor plate 56 fixed in bearing as the buoy and the compass case rotate.

As the buoy rotates, the amount of overlap of the condenser rotor plate 56 and stator 66 varies with the change of bearing of the hydrophone. The amount of this overlap controls the capacity between the stator 66 and surrounding metallic parts of the buoy through the rotor 56.

The condenser rotor plate 56 may be installed in any desired position with respect to the compass magnets 38; the present device as built has the rotor so arranged that with all elements at rest the condenser capacity is greatest when the stator 66 is directly east of the pivot. As the device is installed in the buoy, a line from the pivot through the stator is in essentially the same direction as the axis of maximum sensitivity of the hydrophone. Thus when the hydrophone is so directed that it is most sensitive to sounds arriving from the east, the capacity of the condenser is greatest, disregarding "fluid drag" on the rotor.

What is claimed is:

In a control compass, a variable capacitor adjustable in capacity by the angular position of its mounting relative to the magnetic axis of the earth, a casing comprising said mounting for said variable capacitor, permanent magnets within said casing, a support for said permanent magnets allowing free rotation and tipping thereof comprising a cup bearing, means securing said cup to said casing, a first yoke connecting said permanent magnets, and a pintle secured to said first yoke and positioned in said cup bearing, a damping disc secured to said first yoke, a gimbal ring pivotally connected to said first yoke, a second yoke pivotally connected to said gimbal ring, a shaft secured to said second yoke, a heart-shaped plate mounted on said shaft, a bifurcated plate secured to said casing having arms adjacent opposite sides of said heart-shaped plate, whereby said heart-shaped plate is maintained in a constant angular relationship relative to the magnetic axis of the earth by said permanent magnets, a fluid dielectric, and means for filling said casing with said liquid dielectric.

GEORGE E. BREEZE.

REFERENCES CITED

The following references are of record in the file of this patent:

UNITED STATES PATENTS

| Number | Name | Date |
|---|---|---|
| 2,363,500 | Carter et al. | Nov. 28, 1944 |
| 2,389,664 | Giannini | Nov. 27, 1945 |
| 2,414,448 | Carter | Jan. 21, 1947 |

FOREIGN PATENTS

| Number | Country | Date |
|---|---|---|
| 13,176 | Great Britain | July 17, 1850 |
| 13,624 | Great Britain | Aug. 29, 1889 |